H. C. HUBBELL.
PROCESS FOR MAKING FILAMENTS AND FILAMENTOUS PLATES FOR STORAGE BATTERY ELECTRODES.
APPLICATION FILED JUNE 26, 1911.

1,088,343. Patented Feb. 24, 1914.

WITNESSES:

INVENTOR
Harry C. Hubbell
BY
Frank J. Kent
ATTORNEY

UNITED STATES PATENT OFFICE.

HARRY CROSS HUBBELL, OF NEWARK, NEW JERSEY.

PROCESS FOR MAKING FILAMENTS AND FILAMENTOUS PLATES FOR STORAGE-BATTERY ELECTRODES.

1,088,343.   Specification of Letters Patent.   Patented Feb. 24, 1914.

Application filed June 26, 1911. Serial No. 635,250.

*To all whom it may concern:*

Be it known that I, HARRY CROSS HUBBELL, a citizen of the United States of America, residing at Newark, in the county of Essex and State of New Jersey, have invented certain new and useful Improvements in Processes for Making Filaments and Filamentous Plates for Storage-Battery Electrodes, of which the following is a specification.

Figure 1:
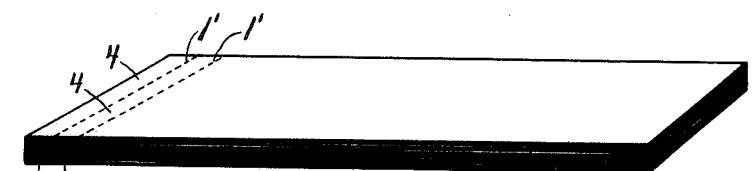
Figure 2:
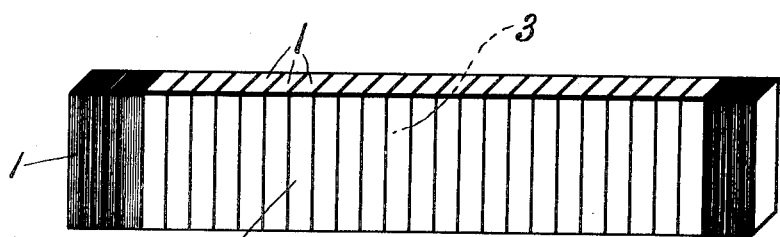

My present invention relates to a process for making the conducting filaments and filamentous plates for storage battery electrodes. Said process in its preferred form is as follows:—I aggregate like the leaves of a book alternate layers of different materials or metals of different solubility, such as nickel and copper. I then unite this aggregation by welding, brazing or soldering, and subject it to pressure preferably in a rolling-mill to reduce the layers to film-like thickness. I then cut up the resulting sheet into strips or bars. Then I may immediately separate the nickel layers by dissolving out the intermediate layers of copper and thereby release the nickel layers in the form of filaments; or I may first unite the bars into any desired arrangement to make up a plate for an electrode, the arrangement of the bars preferably being side by side with their layers extending edgewise to the faces of the plate, as in my copending application, Serial No. 631,271, filed June 5, 1911; and this being accomplished I may then dissolve out the copper to leave what I may conveniently call a "filamentous" nickel plate, consisting of numerous thin nickel strips united by their ends to form a plate, said strips being arranged in close face to face parallelism disposed edgewise to the faces of the plate. Fig. 2 shows this plate after it has been cut up into bars 1, as along the lines 1' of Fig. 1, and after these bars have been re-arranged to form a storage battery electrode wherein the layers are disposed edgewise to the faces 2 and 3 of the plate that is, with the surfaces 4—4 designated in Fig. 1 placed in abutment.

To give further working details, I find that I can use relatively thick sheets of nickel say $\frac{1}{32}$ of an inch thick alternating with sheets of copper foil which have first been dipped in a solution of borax. In this way I pile up a book of eight or ten or more sheets. I then heat them to braze the nickel sheets together, the copper acting as a sort of hard solder. This is followed by the rolling operation by which I reduce the individual nickel sheets to a thickness of from one-fourth to one-third of a thousandth of an inch. Then the rolled sheet is cut up into strips or bars which may be about one inch long by three-sixteenths of an inch wide and which will, of course, have the thickness of the rolled sheets whatever that may be. I now may make either loose nickel filaments or my so-called "filamentous" nickel plate. For the former it is only necessary to dissolve out the thin copper layers between the nickel layers by immersing the bars in cyanid, preferably of potassium, or by making them an anode in an electrolyte, consisting of a water solution of sodium and ammonium acetate containing free ammonia as described in my aforesaid copending application.

I have already described how I produce the "filamentous" plate and it is sufficient here to add to that description that after the bars have been united in the form of a plate, I then dissolve out the copper as above.

My process is not limited to particular metals. Instead of merely nickel and copper I may add to these cobalt, and begin the process with a book of sheets or layers of metal in the following order:—copper, cobalt, nickel, cobalt, copper, cobalt, nickel, cobalt, copper. After the rolling, cutting up, uniting of the bars into the plate, and the solution of the copper layers, etc., I produce from this combination a "filamentous" cobalt-nickel plate wherein the cobalt on oxidation becomes the active material covering the nickel strips. Similarly I can substitute for the copper in the nickel-copper book of layers, other metals having similar differences in solubility. Thus for the copper I may substitute cadmium, tin, etc., and for the nickel I may substitute cobalt or iron, etc. In the case of cadmium, I may separate it from the metal of the other layers by distillation instead of solution; or I may convert it from the metal into cadmium oxid by heating in the air.

From the example given it will be seen that any materials can be aggregated as described, provided they are of sufficiently different properties, whereby a process can be applied thereto which will separate the layers, as, for instance, any eliminating process which is effective on one set of layers but not on the others.

As a preferred addition to the foregoing, I provide the following improvement to prevent the nickel layers or their equivalent, such as cobalt, etc., from welding into direct contact with each other on account of the fluidity of the copper (or equivalent brazing, or soldering metal) permitting it to flow out at places from between the nickel layers. This preferred addition consists in providing intermediate sheets of iron or other suitable metal which is refractory at the welding, brazing or soldering temperature; for instance, instead of a book of sheets or layers of merely nickel and copper, I add sheets of iron, the order of the sheets in building up the book being:—nickel, copper, iron, copper, nickel, copper, iron, copper, nickel, etc. When the sheets of this book are welded together, the iron sheets being refractory keep the nickel sheets separated and prevent them from welding directly with each other. The result is that the nickel sheets remain separate and distinct and are completely separated the moment the copper and iron layers are eliminated. This elimination is effected as already described after the book of sheets are bound together by the copper or other brazing or soldering material and has been put through a rolling operation to reduce the thickness of the sheets. To free the nickel layers from the iron and copper, I immerse the plate in a dilute acid solution to dissolve out the iron, and then make it an anode in a cyanid or ammonium acetate solution to dissolve out the copper. However, referring to this last step of dissolving out the copper, I have found a substitute electrolyte for the above solutions which gives a more rapid solution of the copper than any other of which I know. This substitute electrolyte is a solution of bisodium ammonium phosphate maintaining an excess of ammonia in the solution during the electrolysis. For cathode I use iron, copper or nickel to receive the deposit of copper.

By "welding operation" in the claims is meant not only strict welding but any other substitute operation for the purposes of this invention, such as brazing or soldering, etc.

Having thus described my invention, what I claim is:

1. The process of making conducting filaments or filamentous plates for storage battery electrodes which comprises aggregating a book of alternate layers of suitably different materials, subjecting the aggregation to pressure which reduces the materials to thinner layers, then cutting up the aggregation into elongated pieces, and subjecting the pieces to an eliminating process effective on one set of layers but not on the set desired to be retained to constitute the filaments.

2. The process of making conducting filaments or filamentous plates for storage battery electrodes which comprises aggregating a book of alternate layers of suitably different metals, subjecting the aggregation to pressure which reduces the metals to thinner layers, then cutting up the aggregation into elongated pieces, and subjecting the pieces to an eliminating process effective on one set of layers but not on the set desired to be retained to constitute the filaments.

3. The process of making conducting filaments or filamentous plates for storage battery electrodes which comprises aggregating a book of alternate layers of different metals, uniting the aggregation by a welding operation, subjecting it to a rolling operation to reduce the metals to thinner layers, cutting up the resulting sheet into elongated pieces, and subjecting the pieces to an eliminating process effective on one set of layers but not on the set desired to be retained to constitute the filaments.

4. The process of making conducting filaments or filamentous plates for storage battery electrodes which comprises aggregating a book of alternate layers of different metals, uniting the aggregation by a welding operation, subjecting it to a rolling operation to reduce the metals to thinner layers, cutting up the resulting sheet into elongated pieces, uniting said pieces into a plate with their layers directed edgewise to the faces of the plate, and subjecting the said plate to an eliminating process effective on one set of layers but not on the set desired to be retained to constitute the filaments of the plate.

5. The process which comprises aggregating a book of alternate layers of suitably different materials, subjecting the aggregation to pressure which reduces the materials to thinner layers, and applying an eliminating process effective on one set of layers but not on another set.

6. The process which comprises aggregating a book of alternate layers of suitably different metals, subjecting the aggregation to pressure which reduces the metals to thinner layers, and applying an eliminating process effective on one set of layers but not on another set.

7. The process which comprises aggregating a book of alternate layers of different metals, uniting the aggregation by a welding operation, subjecting it to pressure to reduce the metals to thinner layers, and applying an eliminating process effective on one set of layers but not on another set.

8. The process which comprises aggregating a book of sheets of the metal desired to be retained in the form of films, said sheets being separated by sheets of a metal refractory to heat to keep the sheets of the desired metal from uniting with each other during the following operation; uniting said sheets by heat applied thereto and to a brazing or soldering metal applied between said sheets; subjecting the aggregation to pressure to reduce the thickness of the sheets; and applying an eliminating process effective on the refractory and the brazing or soldering metals but not on the metal desired for the films.

9. The process which comprises aggregating a book of sheets of nickel-like metal, said sheets being separated by sheets of a more refractory metal; uniting said sheets by heat applied thereto and to a brazing or soldering metal applied between said sheets; subjecting the aggregation to pressure to reduce the thickness of the sheets; and applying an eliminating process effective on the refractory and brazing or soldering metals but not on the nickel-like metal desired for the films.

In testimony whereof I affix my signature in presence of two witnesses.

HARRY CROSS HUBBELL.

Witnesses:
 WILLIAM R. BAIRD,
 E. W. SCHERR, Jr.